(12) United States Patent
Lee et al.

(10) Patent No.: US 8,997,041 B2
(45) Date of Patent: Mar. 31, 2015

(54) METHOD OF MANAGING SCRIPT, SERVER PERFORMING THE SAME AND STORAGE MEDIA STORING THE SAME

(71) Applicants: Chun Sik Lee, Seoul (KR); Jeong Hyun Wi, Seoul (KR); Hye Kyoung Chon, Seoul (KR); Joon Ik Lee, Seoul (KR); Deok Young Hwang, Seoul (KR); Jung In Park, Seoul (KR)

(72) Inventors: Chun Sik Lee, Seoul (KR); Jeong Hyun Wi, Seoul (KR); Hye Kyoung Chon, Seoul (KR); Joon Ik Lee, Seoul (KR); Deok Young Hwang, Seoul (KR); Jung In Park, Seoul (KR)

(73) Assignee: LG CNS Co., Ltd., Seoul (KR)

( * ) Notice: Subject to any disclaimer, the term of this patent is extended or adjusted under 35 U.S.C. 154(b) by 76 days.

(21) Appl. No.: 13/852,232

(22) Filed: Mar. 28, 2013

(65) Prior Publication Data
US 2013/0290929 A1 Oct. 31, 2013

(30) Foreign Application Priority Data
Mar. 29, 2012 (KR) .................. 10-2012-0032703

(51) Int. Cl.
*G06F 9/44* (2006.01)
*G06F 17/30* (2006.01)

(52) U.S. Cl.
CPC ............ *G06F 8/71* (2013.01); *G06F 17/30896* (2013.01)
USPC ............................ 717/115; 717/114; 717/122

(58) Field of Classification Search
CPC .................................................... G06F 8/71
USPC .................................................. 717/114–123
See application file for complete search history.

(56) References Cited

U.S. PATENT DOCUMENTS

| | | | |
|---|---|---|---|
| 5,226,163 A * | 7/1993 | Karsh et al. ........................ 1/1 |
| 5,659,547 A * | 8/1997 | Scarr et al. ..................... 714/4.4 |
| 6,871,346 B1 * | 3/2005 | Kumbalimutt et al. ....... 718/104 |
| 8,522,203 B1 * | 8/2013 | Tibbett et al. ................. 717/115 |
| 2005/0193269 A1 * | 9/2005 | Haswell et al. ................. 714/38 |

OTHER PUBLICATIONS

Anzböck, Rainer, Schahram Dustdar, and Harald Gall. "Software configuration, distribution, and deployment of web-services." Proceedings of the 14th international conference on Software engineering and knowledge engineering. ACM, 2002, pp. 649-656.*

(Continued)

*Primary Examiner* — Satish Rampuria
(74) *Attorney, Agent, or Firm* — Hunter E. Webb; Keohane & D'Alessandro, PLLC

(57) ABSTRACT

The present invention relates to a script management technology. Disclosed are approaches for managing scripts carried out in a script management server, which is connected to a user terminal and which manages script codes. Approaches comprise preparing a plurality of databases including a meta database and a plurality of script databases without necessarily separating physically the two types of databases; designating an active script database by providing the plurality of the original script lists to the user terminal; and storing identifiers of the user terminal and the designated active script database in the meta database, where the plurality of script databases are classified according to script version and each of them manages the original script code and user-specific script code, and the meta database manages a plurality of the original script lists related to the plurality of script databases and a list of user-specific scripts.

23 Claims, 13 Drawing Sheets

(56) References Cited

OTHER PUBLICATIONS

Jakobovits, Rex M., and James F. Brinkley. "Managing medical research data with a Web-Interfacing Repository Manager." Proceedings of the AMIA Annual Fall Symposium. American Medical Informatics Association, 1997,pp. 454-458.*

Hull, Richard. "Managing semantic heterogeneity in databases: a theoretical prospective." Proceedings of the sixteenth ACM SIGACT-SIGMOD-SIGART symposium on Principles of database systems. ACM, 1997, pp. 51-61.*

* cited by examiner

Fig 4

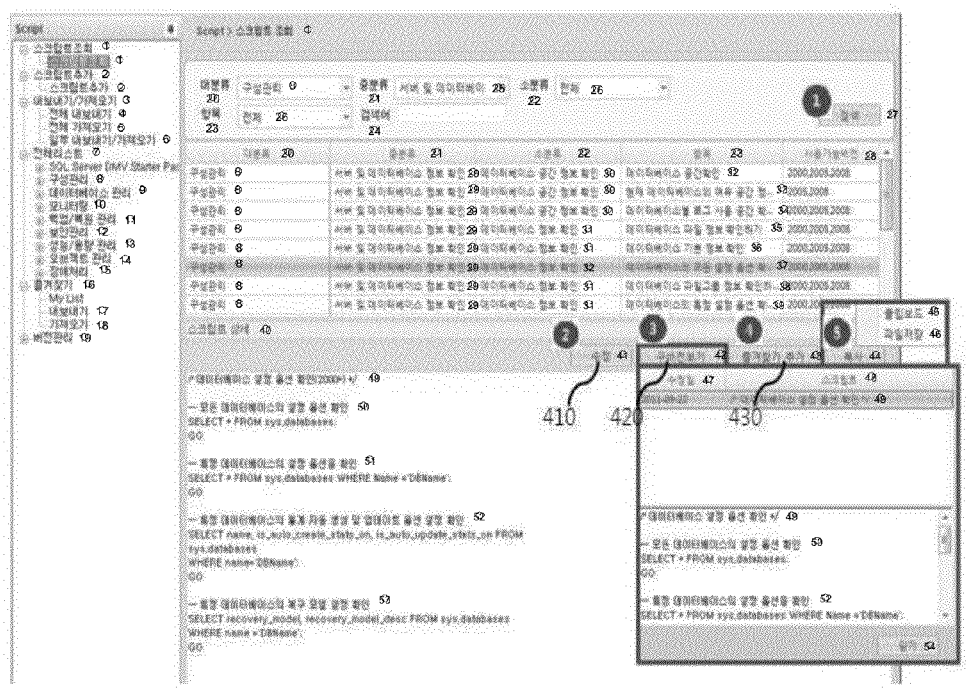

① script inquiry
② script add
③ export/import
④ all export
⑤ all import
⑥ some export/import
⑦ list all
⑧ diagnostic items
⑨ database management
⑩ monitoring
⑪ backup/restoration management
⑫ security management
⑬ performance/capacity management
⑭ object management
⑮ fault recovery
⑯ bookmark
⑰ export
⑱ import
⑲ version management
⑳ main category ㉑ medium category
㉒ sub category
㉓ item
㉔ search word
㉕ server and database
㉖ all
㉗ search
㉘ available versions
㉙ server and database information check
㉚ database space information check
㉛ database information check
㉜ database space check
㉝ current database free space...
㉞ database log using space check
㉟ database file information check
㊱ database basics information check
㊲ database all set-up option check
㊳ database file group information check
㊴ database specific set-up option check
㊵ script details ㊶ modify
㊷ previous version
㊸ bookmark add
㊹ copy
㊺ clipboard
㊻ file save
㊼ modify date
㊽ script
㊾ database set-up option check
㊿ all database set-up option check
51 specific database set-up option check
52 specific database automatic generation of statistics and update option set-up check
53 specific database restoration model set-up check
54 close

Fig 6

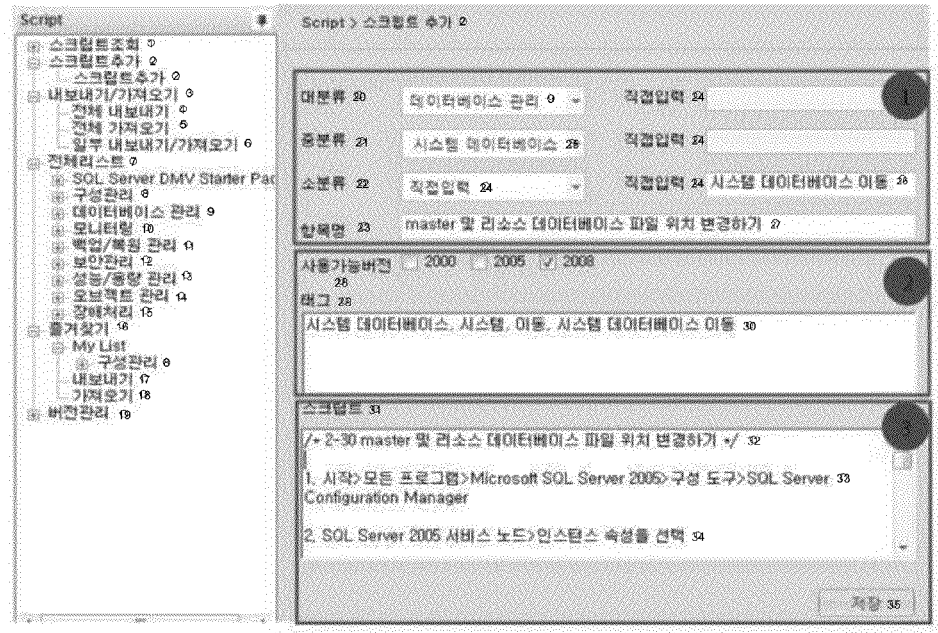

| ① script inquiry | ⑬ performance/capacity management | ㉕ system database |
| ② script add | ⑭ object management | ㉖ moving system database |
| ③ export/import | ⑮ fault recovery | ㉗ master and resource database file to change the location |
| ④ all export | ⑯ bookmark | ㉘ available versions |
| ⑤ all import | ⑰ export | ㉙ tag |
| ⑥ some export/import | ⑱ import | ㉚ system database, system, moving, moving system database |
| ⑦ list all | ⑲ version management | ㉛ database information check |
| ⑧ diagnostic items | ⑳ main category | ㉜ database space check |
| ⑨ database management | ㉑ medium category | ㉝ start>all program>Microsoft SQL Server 2005> configuration tool>SQL Server Configuration Manager |
| ⑩ monitoring | ㉒ sub category | ㉞ SQL Server 2005 service node> instance properties selection |
| ⑪ backup/restoration management | ㉓ item | ㉟ save |
| ⑫ security management | ㉔ direct input | |

Fig 8

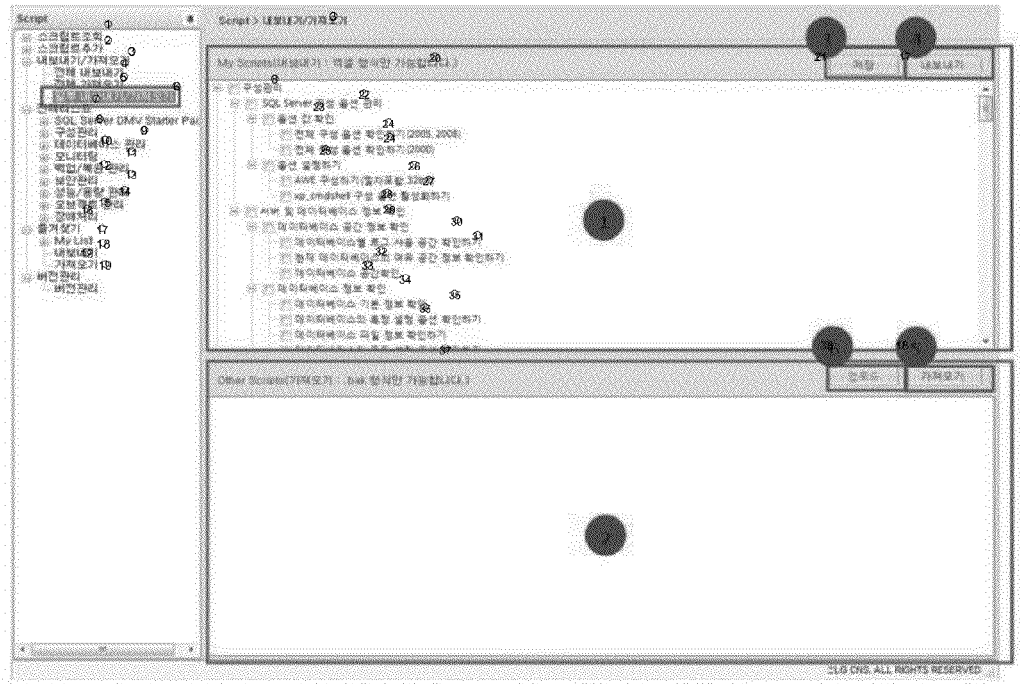

| | | |
|---|---|---|
| ① script inquiry | ⑯ bookmark | ㉛ current database free space check |
| ② script add | ⑰ export | ㉜ database space check |
| ③ export/import | ⑱ import | ㉝ database information check |
| ④ all export | ⑲ version management | ㉞ database basics information check |
| ⑤ all import | ⑳ export : only excel format | ㉟ database specific set-up option check |
| ⑥ some export/import | ㉑ save | ㊱ database file information check |
| ⑦ list all | ㉒ SQL Server configuration option management | ㊲ database all set-up option check |
| ⑧ diagnostic items | ㉓ option value check | ㊳ import : only .bak format |
| ⑨ database management | ㉔ all configuration option check | |
| ⑩ monitoring | ㉕ options setting | |
| ⑪ backup/restoration management | ㉖ AWE configuring | |
| ⑫ security management | ㉗ xp_cmdshel configuration option enble | |
| ⑬ performance/capacity management | ㉘ server and database information check | |
| ⑭ object management | ㉙ database space information check | |
| ⑮ fault recovery | ㉚ database log using space check | |

Fig 9

① script inquiry
② script add
③ export/import
④ all export
⑤ all import
⑥ some export/import
⑦ list all
⑧ diagnostic items
⑨ database management
⑩ monitoring
⑪ backup/restoration management
⑫ security management
⑬ performance/capacity management
⑭ object management
⑮ fault recovery
⑯ bookmark
⑰ export
⑱ import
⑲ version management
⑳ export my script?
㉑ yes
㉒ no ㉓ main category
㉔ medium category
㉕ sub category
㉖ search word
㉗ all
㉘ search
㉙ item
㉚ available versions
㉛ library
㉜ document
㉝ document search
㉞ configuration
㉟ new folder
㊱ bookmark
㊲ download
㊳ wallpaper
㊴ recent location
㊵ video
㊶ picture
㊷ music
㊸ home group
㊹ computer ㊺ document library
㊻ including location
㊼ sort
㊽ folder
㊾ name
㊿ modify date
51 type
52 size
53 script component
54 script task
55 AM
56 PM
57 file folder
58 folder name
59 folder format
60 hide folder
61 backup file
62 save
63 cancel

Fig 11

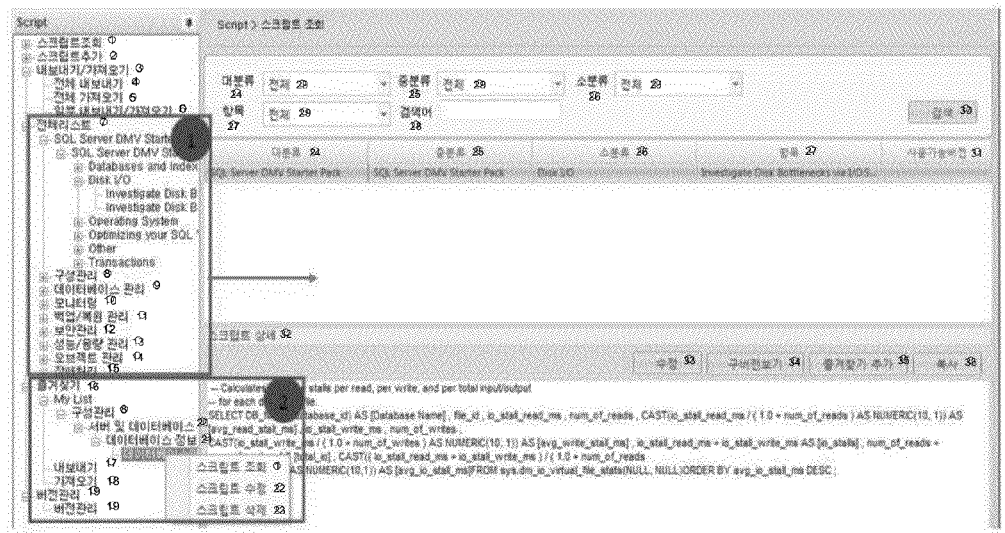

① script inquiry
② script add
③ export/import
④ all export
⑤ all import
⑥ some export/import
⑦ list all
⑧ diagnostic items
⑨ database management
⑩ monitoring
⑪ backup/restoration management
⑫ security management
⑬ performance/capacity management
⑭ object management
⑮ fault recovery
⑯ bookmark
⑰ export
⑱ import
⑲ version management
⑳ server and database
㉑ database information
㉒ script modify
㉓ script delete
㉔ main category
㉕ medium category
㉖ sub category
㉗ item
㉘ search word
㉙ all
㉚ search
㉛ available versions
㉜ script details
㉝ modify
㉞ previous version
㉟ bookmark add
㊱ copy

Fig 13

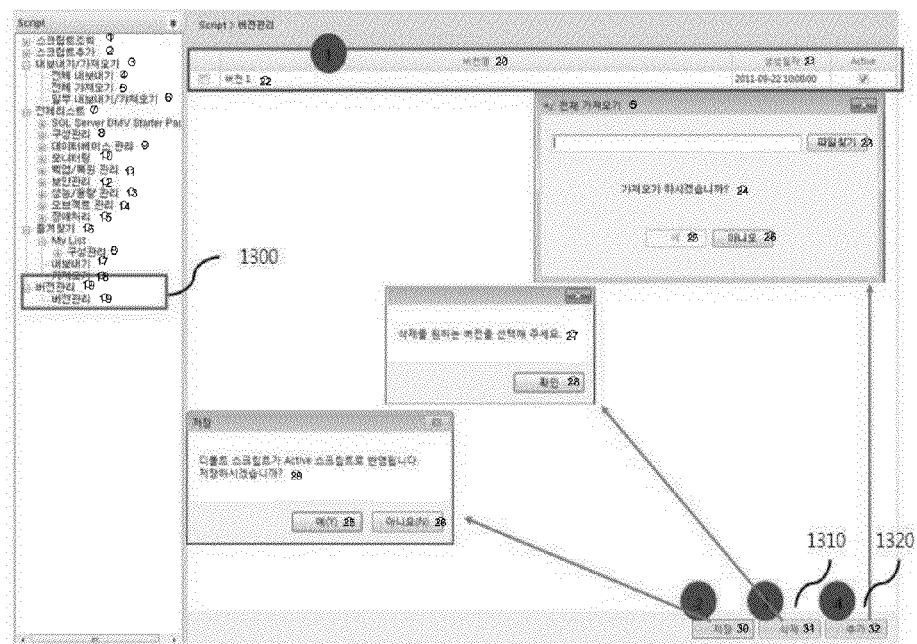

① script inquiry
② script add
③ export/import
④ all export
⑤ all import
⑥ some export/import
⑦ list all
⑧ diagnostic items
⑨ database management
⑩ monitoring
⑪ backup/restoration management
⑫ security management
⑬ performance/capacity management
⑭ object management
⑮ fault recovery
⑯ bookmark
⑰ export
⑱ import
⑲ version management
⑳ version name
㉑ creation date
㉒ version 1
㉓ file search
㉔ would you like to import?
㉕ yes
㉖ no
㉗ Select the version you want to delete.
㉘ OK
㉙ Default script is reflected in active script. Would you like to save?
㉚ save
㉛ delete
㉜ add

Fig 14

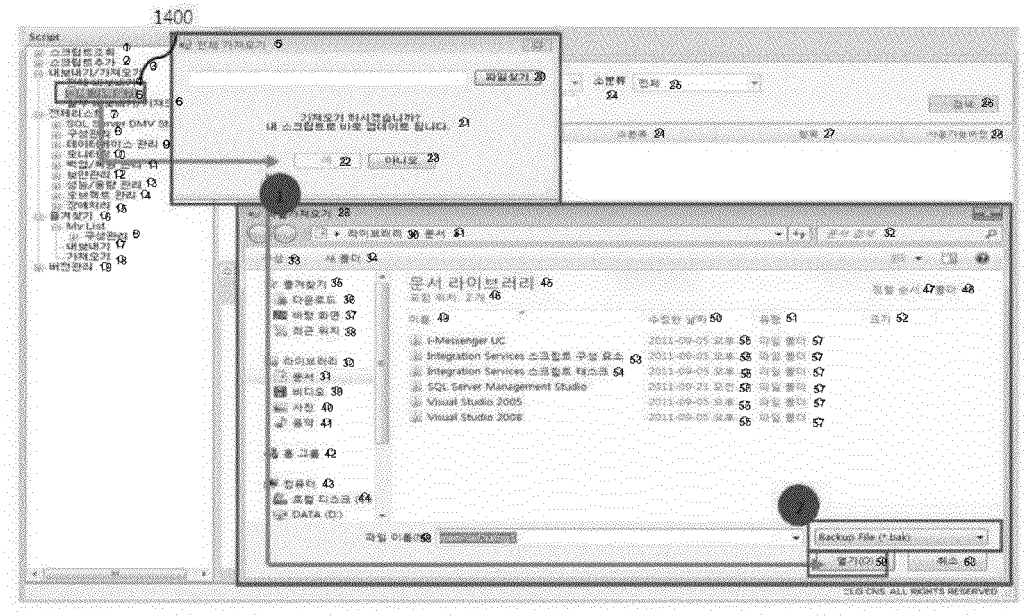

| | | |
|---|---|---|
| 1 script inquiry | 21 would you like to import? My script is updated immediately. | 41 music |
| 2 script add | 22 yes | 42 home group |
| 3 export/import | 23 no | 43 computer |
| 4 all export | 24 sub category | 44 local disk |
| 5 all import | 25 all | 45 document library |
| 6 some export/import | 26 search | 46 including location |
| 7 list all | 27 item | 47 sort |
| 8 diagnostic items | 28 available versions | 48 folder |
| 9 database management | 29 file import | 49 name |
| 10 monitoring | 30 library | 50 modify date |
| 11 backup/restoration management | 31 document | 51 type |
| 12 security management | 32 document search | 52 size |
| 13 performance/capacity management | 33 configuration | 53 script component |
| 14 object management | 34 new folder | 54 script task |
| 15 fault recovery | 35 bookmark | 55 PM |
| 16 bookmark | 36 download | 56 AM |
| 17 export | 37 wallpaper | 57 file folder |
| 18 import | 38 recent location | 58 folder name |
| 19 version management | 39 video | 59 open |
| 20 file search | 40 picture | 60 cancel |

METHOD OF MANAGING SCRIPT, SERVER PERFORMING THE SAME AND STORAGE MEDIA STORING THE SAME

CROSS-REFERENCE TO RELATED APPLICATION

This application claims priority under 35 U.S.C. §119 to Korean Patent Application No. 10-2012-0032703, filed on Mar. 29, 2012, in the Korean Intellectual Property Office, the contents of which is incorporated herein by reference.

BACKGROUND OF THE INVENTION

1. Field of the Invention

The present invention relates to a script managing technology and more particularly, to a method for managing scripts, which manages scripts for user terminals according to the user's version.

2. Discussion of the Related Art

A script refers to a program describing a procedure of executing software. Popular script languages include Perl on UNIX machines, JavaScript of Netscape, and VBScript developed by Microsoft. These script language files are stored in the form of XML (Extensible Markup Language) file.

3. Prior Art Related to Script

The Korean patent registration No. 10-1050476 belongs to a prior art related to script technology, describing a script managing method based on a storage management server and a computer-readable recording medium recording a program implementing the method, where the patent application discloses a technology which stores a script generation logic beforehand and upon receiving a script generation request, generates a script including configuration information and a backup script in response to the script generation request by using the script generation logic.

The Korean patent registration No. 10-1028928 relates to an apparatus for managing scripts to analyze web logs in the CDN environment and a method for the apparatus, where the patent application discloses a technology which substitutes a method of analyzing logs through a CDN server for a method of analyzing logs through the website of a client company, thereby enabling the client company to analyze web logs without an additional editing work such as inserting a script into the web page.

The script management technology in the prior art provided only a few (36 or so) sample scripts in the form of XML file rather than database file. With the prior technology lacking a function of managing the original script code and user-specific script code separately according to the script version, it is difficult to use a script file in the environment where software of the corresponding version is not installed. In other words, it is common that the user working in the environment of a different version had to store a script file of the corresponding version separately and when the user needs to use the script file, he or she had to copy the text thereof and paste the copied text into an appropriate version for transmission.

It was not allowed for the user to edit a script file. In order to edit a script file, the user had to store the script file as a new script file, causing a difficulty in version control. Also, the user had to suffer inconvenience of searching for a script file by using a list tree or a search function whenever the user needed to use the script file. Moreover, in the case of software re-installation or upgrade, user-supplied scripts are all removed, thus preventing the use of the corresponding script files.

SUMMARY OF THE INVENTION

One embodiment of the present invention provides a method for managing scripts according to their version, capable of managing the original script code and user-specific script code according to a script version, a script management server carrying out the method, and a storage medium storing the method.

In one embodiment of the present invention, if script codes in an active script database are updated through a user terminal, a method for managing scripts updates the database storing the corresponding script codes, a script management server carrying out the method, and a storage medium storing the method.

In one embodiment of the present invention, if script codes in an active script database are updated through a user terminal, a method for managing scripts tracks a script list and script code of the corresponding user according to the script code version by determining the script code version of the updated script code, a script management server carrying out the method, and a storage medium storing the method.

One embodiment of the present invention provides a method for managing scripts capable of providing a bookmark function for the user by storing shortcuts for particular script codes in a script list of the corresponding user as a favorites list, a script management server carrying out the method, and a storage medium storing the method.

One embodiment of the present invention provides a method for managing scripts capable of providing a backup function for the user by transmitting a script list of the corresponding user and part of script codes to a user terminal read in the form of text file by another computer program, a script management server carrying out the method, and a storage medium storing the method.

In the embodiments of the present invention, a method for managing scripts carried out in a script management server which is connected to a user terminal and manages script codes comprises preparing a plurality of databases including a meta database and a plurality of script databases without necessarily separating physically the two types of databases; designating an active script database by providing the plurality of the original script lists to the user terminal; and storing identifiers of the user terminal and the designated active script database in the meta database. The plurality of script databases are classified according to script version and each of them manages the original script code and user-specific script code and the meta database manages a plurality of the original script lists related to the plurality of script databases and a list of user-specific scripts.

In one embodiment, the method further comprises, if a script code in the active script database is updated through the user terminal, updating a script list and script codes of the corresponding user stored in the meta database and the designated active script database, respectively.

In one embodiment, each of the list of original scripts and the list of user-specific scripts can be generated to form a tree structure according to a function of the corresponding script code.

In one embodiment, the updating a script list and script codes of the corresponding user further comprises determining a script code version of the updated script code. In one embodiment, the updating a script list and script codes of the corresponding user further comprises enabling each of the meta database and the designated active script database to track a script list and script codes of the corresponding user according to the determined script code version.

In another embodiment, the updating a script list and script codes of the corresponding user further comprises, if the script code is updated through the user terminal, updating the script in the plurality of script databases into a script of new version for the corresponding script.

In one embodiment, if another active script database is designated by the user terminal, updating the stored identifier of the active script database is further comprised. In one embodiment, removing a script list and script codes of the corresponding user through the user terminal is further comprised.

In one embodiment, if addition of a particular script is requested by the user terminal, adding the particular script into the active script database is further comprised.

In one embodiment, allowing the user terminal to store short cuts to particular script codes in the script list of the corresponding user as a favorites list is further comprised. In one embodiment, the allowing short cuts as a favorites list further comprises recording the path and identifier of the corresponding script in a bookmark file and providing the bookmark file to the user terminal.

In one embodiment, transmitting a script list and part of script codes of the corresponding user to the user terminal read in the form of text file by another computer program is further comprised.

In one embodiment, transmitting a script list and part of script codes of the corresponding user to the user terminal as a database backup file read by the script management server is further comprised.

In the embodiments of the present invention, a script management server being connected to a user terminal and managing script codes comprises an active script database designating unit designating an active script database by providing the user terminal with the plurality of the original script lists; a plurality of script databases being classified according to script version and each of which storing original script codes and user-specific script codes; a meta database storing a plurality of the original script lists associated with the plurality of script databases and user-specific script list; and a database updating unit storing identifiers of the user terminal and the designated active script database in the meta database and if a script code in the active script database is updated through the user terminal, updating the script list and script codes of the corresponding user stored respectively in the meta database and the designated active script database.

In one embodiment, each of the original script list and the user-specific script list is generated in the form of tree structure according to the function of the corresponding script code.

In one embodiment, the database updating unit determines script code version of the updated script code. In one embodiment, the database updating unit enables each of the meta database and the designated active script database to track the script list and script codes of the corresponding user according to the script code version determined.

In another embodiment, the database updating unit, if the script code is updated through the user terminal, updates a new version of script for the corresponding script in the plurality of script databases.

In a yet another embodiment, the database updating unit, if another active script database is designated by the user terminal, updates an identifier of the stored active script database.

In a still another embodiment, the database updating unit removes a script list and script codes of the corresponding user through the user terminal.

In a further embodiment, the database updating unit, if addition of a particular script is requested by the user terminal, adds the particular script to the active script database.

In one embodiment, the server further comprises a bookmark managing unit with which the user terminal stores short cuts to particular script codes in a script list of the corresponding user as a favorites list. In one embodiment, the bookmark managing unit records the path and identifier of the corresponding script in a bookmark file and provides the bookmark file to the user terminal.

In one embodiment, the server further comprises a file generating unit which generates a file read in the form of text file by another computer program in the user terminal from a script list of the corresponding user and part of script codes. In one embodiment, the file generating unit generates a database backup file read by the script management server in the user terminal from a script list of the corresponding user and the whole of script codes.

In the embodiments of the present invention, a storage medium storing a computer-readable script comprises an active script database designating unit designating an active script database by providing a user terminal with the plurality of original script lists; a plurality of script being classified according to script version and each of which storing original script codes and user-specific script codes; a meta database storing a plurality of the original script lists associated with the plurality of script databases and user-specific script list; and a database updating unit storing identifiers of the user terminal and the designated active script database in the meta database and if a script code in the active script database is updated through the user terminal, updating the script list and script codes of the corresponding user stored respectively in the meta database and the designated active script database.

BRIEF DESCRIPTION OF THE DRAWINGS

The accompanying drawings, which are included to provide a further understanding of this document and constitute a part of this specification, illustrate embodiments of this document and together with the description serve to explain the principles of this document.

FIG. 4 is a snapshot of carrying out the procedure of FIG. 3;

FIG. 6 is a snapshot of carrying out the procedure of FIG. 5;

FIGS. 8 and 9 are snapshots of carrying out the procedure of FIG. 7;

FIG. 11 is a snapshot of carrying out the procedure of FIG. 10;

FIGS. 13 and 14 are snapshots of carrying out the procedure of FIG. 12.

DETAILED DESCRIPTION OF THE INVENTION

Figure 1:
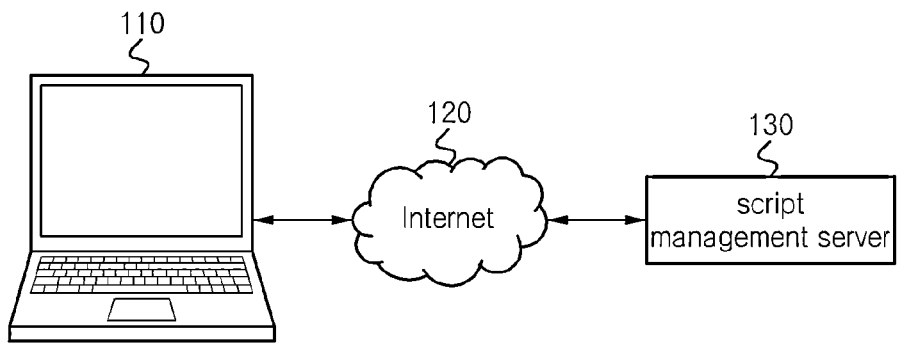
FIG. 1 is a block diagram illustrating a script management system according to one embodiment of the present invention.

This document provides just embodiments of the present invention for the purpose of providing structural or functional descriptions of the present invention. Therefore, it should be understood that the technical scope defined by the appended claims of the present invention is not limited to the embodiments introduced in this document. In other words, since embodiments can be modified in various ways and take various forms of implementation, it should be understood that the technical scope defined by the claims of the present invention include whichever equivalent thus realizing the technical principles of the present invention.

Meanwhile, terms introduced in this document should be understood as follows.

Terms such as first, second, and so on are intended for identifying one component from another but the technical scope should not be limited by the terms. For example, a first component may be called a second component and vice versa.

If a component is said to be "connected" to a different component, the component may be directly connected to the different component but a third component may exist to connect the two components even though the two components may be connected directly. On the other hand, if a component is said to be "connected directly" to another component, it should be interpreted that there is no further component between the two components. Similarly, other expressions describing relationships between components such as "between" and "just between" or "next to" and "immediately next to" and the like should also be understood in the same way as above.

Singular expression should be interpreted to include plural expressions unless otherwise stated explicitly. Terms such as "include" or "have" are meant to signify existence of embodied characteristics, numbers, steps, behavior, components, modules, and combinations thereof, which should be understood that possibility of existence or addition of one or more characteristics, numbers, steps, behavior, components, modules, and combinations thereof are not precluded beforehand.

Identifying symbols for individual steps (for example, a, b, c, and so on) are used for the purpose of convenience of description and do not intend to represent the order of the steps; unless a particular order is specified, individual steps can be carried out in an order different from that used in this document. In other words, individual steps can be carried out in the same order as described in the document, virtually at the same time, or in the opposite order.

The present invention can be implemented in a computer-readable recording medium in the form of computer-readable program codes. Computer-readable recording media include all types of recording apparatus in which computer-readable data are stored. Examples of a computer-readable recording medium are ROM, RAM, CD-ROM, magnetic tape, floppy tape, optical data storage device, and so on. Implementation in the form of carrier waves (for example, transmission through the Internet) can also be regarded as an example of computer-readable recording medium. Computer-readable recording media can be distributed across computer systems connected to each other through a network and computer-readable program codes can be stored and executed in a distributed manner.

Unless otherwise defined, all the terms used in this document possess the same meaning as understood by those skilled in the art to which the present invention belongs. The terms such as those defined in a dictionary for general use should be interpreted to carry the same contextual meaning in the related technology and they should not be interpreted to possess an ideal or excessively formal meaning.

FIG. 1 is a block diagram illustrating a script management system according to one embodiment of the present invention.

With reference to FIG. 1, a script management system 100 comprises a user terminal 110, the Internet 120, and a script management server 130. The user terminal 110 is connected to the script management server 130 through the Internet 120.

The user terminal 110 may correspond to a portable computing device such as a smart phone, PDA (Personal Digital Assistant), and tablet PC. Receiving a script from the script management server 130, the user terminal 110 can edit the corresponding script.

In one embodiment, the user terminal 110 receives a script from the script management server 130 periodically.

In another embodiment, the user terminal 110 receives a script from the script management server 130 at particular time intervals. In this case, the user terminal 110 edits a script received from the script management server 130 and stores the edited script as a temporary version and provides the script management server 130 with or removes the corresponding script of temporary version at particular time intervals.

In yet another embodiment, the user terminal 110 requests a script from the script management server 130 at particular time intervals. For example, the user terminal 110 may request from the script management server 130 a script for inquiry or update.

The script management server 130 may correspond to a computing device connected to the user terminal 110 through the Internet 120 and scripts provided to the user terminal 110 can be managed according to their version. Here, the script management server 130 is not limited to a single type of computing device but can be realized in the form of a plurality of computing devices capable of distributed processing. The script management server 130 will be described with reference to FIG. 2.

In one embodiment, the script management server 130 may correspond to a server collaborating continuously with the user terminal 110. This kind of scheme works even after a script is provided to the user terminal 110 as the user terminal 110 can be connected to the script management server 130 during a script management procedure.

In one embodiment, the script management server 130 provides a script to the user terminal 110 at particular time intervals. Here, the particular time interval is determined dynamically depending on the amount of load applied to the script management server 130.

In another embodiment, the script management server 130 provides a script to the user terminal 110 each time a request is issued by the user.

Figure 2:
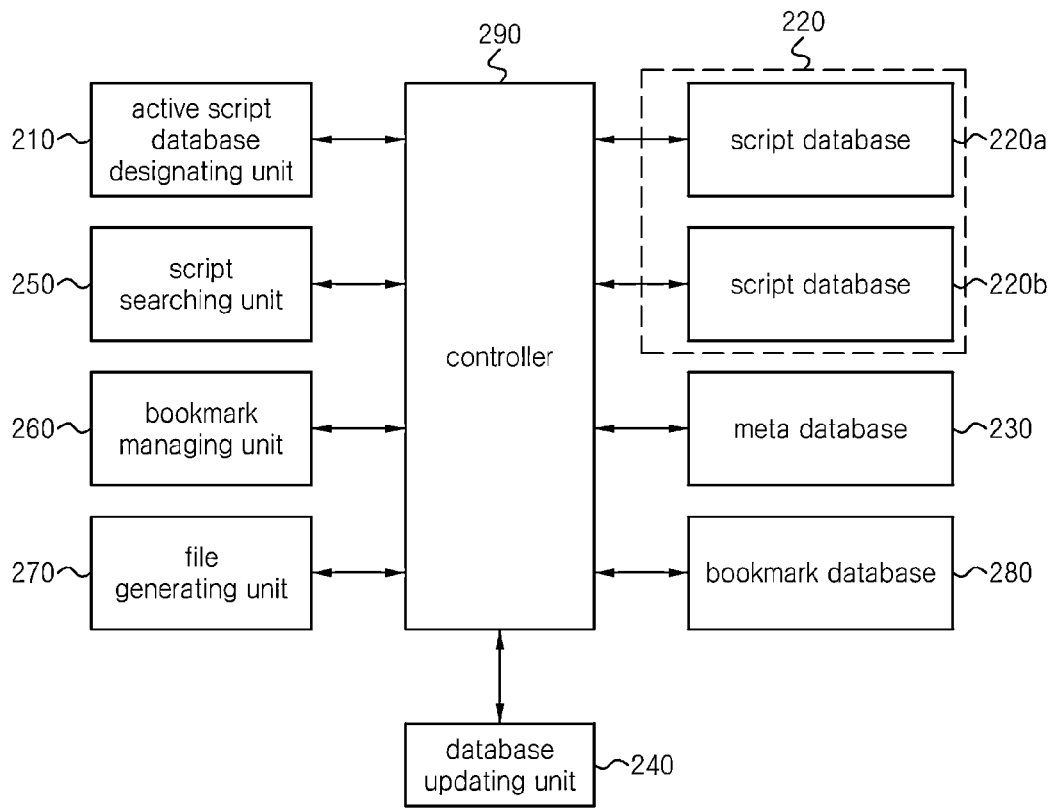
FIG. 2 is a block diagram of a script management server of FIG. 1.

FIG. 2 is a block diagram of a script management server of FIG. 1.

With reference to FIG. 2, the script management server 130 comprises an active script database designating unit 210, a plurality of script databases 220, a meta database 230, and a database updating unit 240. In one embodiment, the script management server 130 further comprises a script searching unit 250, a bookmark managing unit 260, a file generating unit 270, a bookmark database 280, and a controller 290.

The active script database designating unit 210 designates one of plurality of script databases 220 as an active script database.

In one embodiment, the active script database designating unit 210 provides a plurality of original script lists in the meta database 230 to the user terminal 110 and if a particular original script is selected by the user terminal 110, designates a script database containing the corresponding original script as an active script database.

In another embodiment, if another active script database is designated by the user terminal 110, the active script database designating unit 210 designates the corresponding database as an active script database.

The script searching unit 250 searches a plurality of script databases 220 for a particular script and provides the searched script to the user terminal 110.

In one embodiment, the script searching unit 250 searches the meta database 230 for the identifier of an active script database associated with the corresponding user and searches the active script database 220a corresponding to the searched identifier for a particular script and provides the user terminal 110 with the particular script searched.

The bookmark managing unit 260, if bookmark addition for a particular script is selected through the user's operation, stores a short cut to the particular script code in a script list of the corresponding user into a favorites list.

The file generating unit 270 generates a list of scripts in a database as a file.

In one embodiment, the file generating unit 270 generates a list of scripts associated with the user as a particular file from among scripts in the active script database 220a. Here, the particular file corresponds to a file which can be read in the form of text by another computer program.

In another embodiment, the file generating unit 270 generates a list of scripts and the whole of script codes associated with the user as a database backup file from among scripts in a plurality of script databases 220. Here, the database backup file corresponds to a file which can be read by the script management server 130.

A plurality of script databases 220 are classified according to their script version and each of the plurality of script databases 220 is used for storing original script codes and user-specific script codes. In one embodiment, a plurality of script databases 220 are updated when a new version of particular script is added by the user.

The meta database 230 is used for storing a plurality of original script lists associated with a plurality of script databases and a user-specific script list. In one embodiment, the meta database 230 can be used for storing a plurality of original script lists and a user-specific script list in the form of tree structure.

The bookmark database 280 is used for storing a script selected by the user as a bookmark. In one embodiment, the bookmark database 280 can be used for storing the user's identifier (for example, ID) in association with a script selected by the corresponding user.

The database updating unit 240 updates the contents stored in the meta database 230 and a plurality of script databases 220 according to the user's operation.

In one embodiment, the database updating unit 240, if the active script database 220a is designated by the user terminal 110, updates the designated active script database 220a by storing identifiers of the corresponding active script database 220a.

In another embodiment, the database updating unit 240, if a script code in the active script database 220a is updated by the user terminal 110, stores a new version of script in a plurality of script databases 220 and updates a script list of the corresponding user in the meta database 230.

In a yet another embodiment, the database updating unit 240, receiving a script of temporary version from the user terminal 110, stores the corresponding script of temporary version in a plurality of script databases 220.

In addition, different from the embodiment above, the database updating unit 240, if a script code in the active script database 220a is updated through the user terminal 110, can determine the version of the corresponding script code.

In one embodiment, the database updating unit 240 determines the version of a script code as the next to that of a script code last generated. In another embodiment, the database updating unit 240 can determine the version of a script code arbitrarily. Here, the version of a script code can be determined through the user terminal 110 and can correspond to an ordered sequential number, which is not necessarily a natural number.

Similarly, different from the embodiment above, the database updating unit 240 can track a script list of the user and script codes according to the version of a script code.

The controller 290 controls the active script database designating unit 210, a plurality of script databases 220, meta database 230, database updating unit 240, script searching unit 250, bookmark managing unit 260, file generating unit 270, and bookmark database 280.

Figure 3:
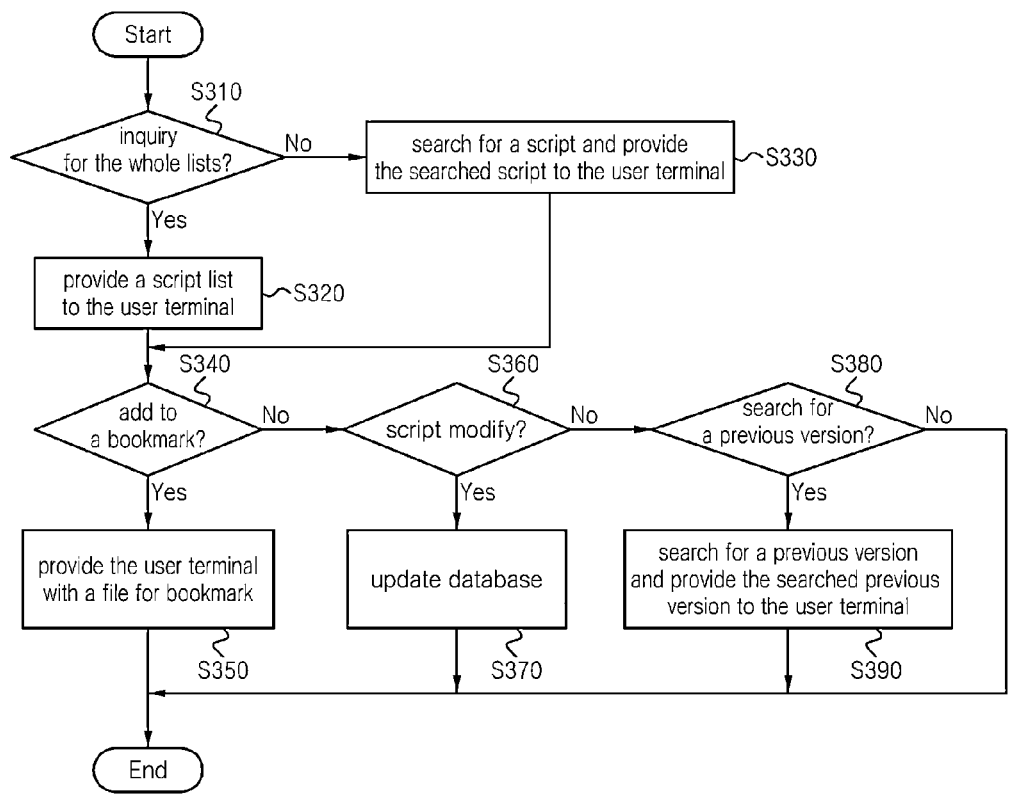
FIG. 3 is a flow diagram illustrating a script inquiry procedure carried out in a script management server of FIG. 1.

FIG. 3 is a flow diagram illustrating a script inquiry procedure carried out in a script management server of FIG. 1 and FIG. 4 is a snapshot of carrying out the procedure of FIG. 3.

As shown in FIGS. 3 and 4, the script searching unit 250, if an inquiry for the whole lists is selected by the user S310, provides a script list associated with the corresponding user to the user terminal 110, S320.

The script searching unit 250, if an inquiry for a particular script is selected by the user S310, searches the active script database 220a associated with the corresponding user for the particular script and provides the searched particular script to the user terminal 110.

In one embodiment, the script searching unit 250 searches the meta database 230 for an identifier of an active script database associate with the corresponding user and searches the active script database 220a corresponding to the searched identifier for a particular script and provides the user terminal 110 with the searched particular script.

The bookmark managing unit 260, if bookmark addition 430 for a particular script is selected by the user S340, provides the user terminal 110 with a particular file S350. In one embodiment, the bookmark managing unit 260 records tree information and a script identifier in a Config file of XML type; and provides the corresponding Config file to the user terminal 110.

The database updating unit 240, if modification 410 of a particular script is selected by the user S360, updates the meta database 230 and a plurality of script databases 220, S370. In one embodiment, the database updating unit 240 can update a plurality of script databases 220 with a new version of the corresponding script.

The script searching unit 250, if an inquiry 420 for a previous version of a particular script is selected by the user S380, searches a particular database among a plurality of script databases 220 for the script and provides the user terminal 110 with the searched particular script S390. Here, the particular database corresponds to a database storing the previous version of the particular script.

Figure 5:
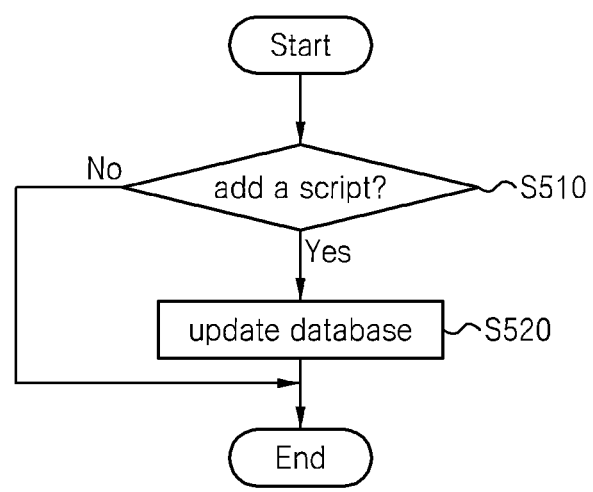
FIG. 5 is a flow diagram illustrating a procedure of adding a script carried out in a script management server of FIG. 1.

FIG. 5 is a flow diagram illustrating a procedure of adding a script carried out in a script management server of FIG. 1 and FIG. 6 is a snapshot of carrying out the procedure of FIG. 5.

As shown in FIGS. 5 and 6, the database updating unit 240, if script addition is selected by the user S510, updates an active script database 220a associated with the corresponding user S520. In one embodiment, the database updating unit 240 searches the meta database 230 for the identifier of an active script database associated with the corresponding user and adds a script to the active script database 220a corresponding to the searched identifier.

Figure 7:
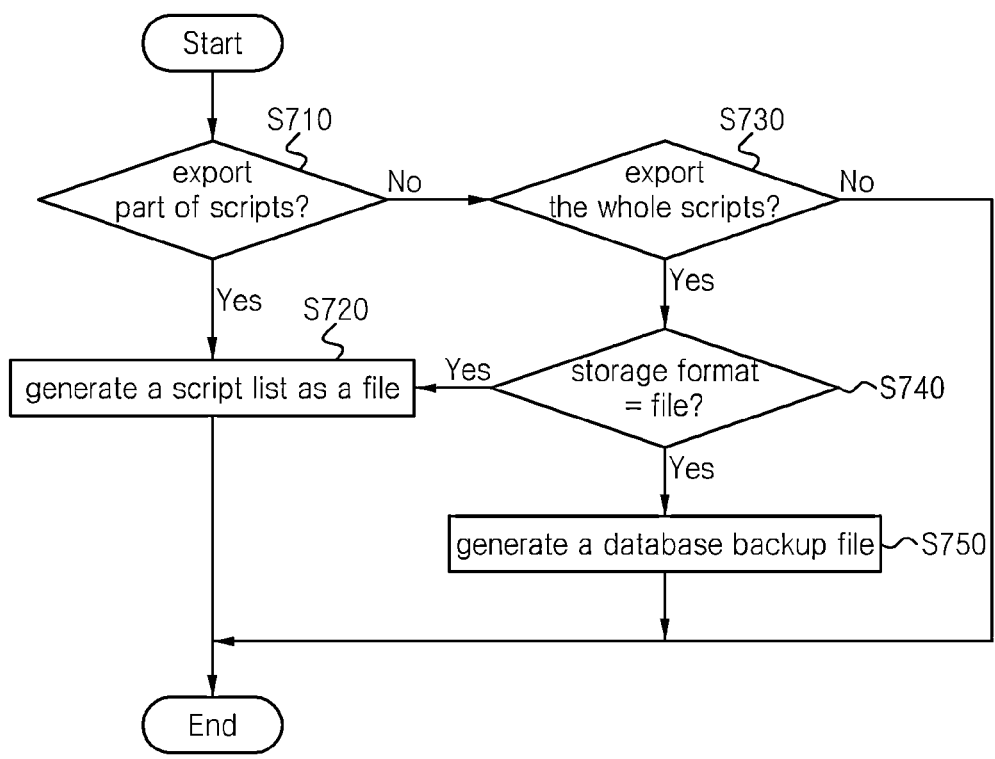
FIG. 7 is a flow diagram illustrating a procedure of exporting part of the whole of script carried out in a script management server of FIG. 1.

FIG. 7 is a flow diagram illustrating a procedure of exporting part of the whole of script carried out in a script management server of FIG. 1; and FIGS. 8 and 9 are snapshots of carrying out the procedure of FIG. 7.

As shown in FIGS. 7 to 9, the file generating unit 270, if exporting part of a script is selected by the user S710, generates a list of scripts in an active script database 220a associated with the corresponding user as a file S720.

In one embodiment, the file generating unit 270 searches the meta database 230 for the identifier of the active script database associated with the corresponding user terminal and generates a list of scripts in the active script database 220a corresponding to the searched identifier as a file (for example, an excel file).

The file generating unit 270, if exporting the whole scripts is selected by the user S730 and a particular file storage format (for example, *.xls or *.xlsx) is selected by the user, generates a file by using a list of scripts in the active script database 220a associated with the corresponding user S720. In one embodiment, the file generating unit 270 can generate a file which can be read by another computer program in the form of text from a list of scripts of the corresponding user and part of script codes.

The file generating unit 270, if exporting the whole scripts is selected by the user S730 and a particular file storage format is selected as a database backup file (for example, *.bak) by the user S740, generates a database backup file by using a plurality of script databases 220 associated with the corresponding user S750. In one embodiment, the file generating unit 270 can generate a database backup file which can be read by the script management server 130 from a list of scripts of the corresponding user and the whole of script codes.

Figure 10:
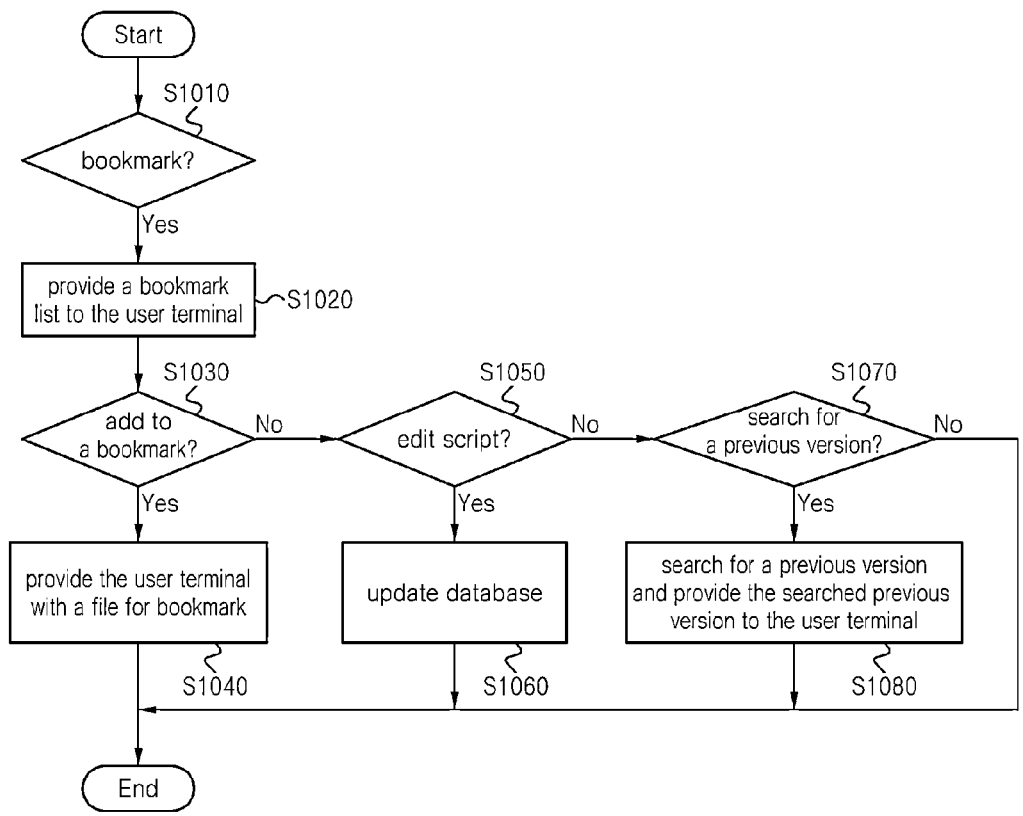
FIG. 10 is a flow diagram illustrating a bookmark procedure carried out in a script management server of FIG. 1.

FIG. 10 is a flow diagram illustrating a bookmark procedure carried out in a script management server of FIG. 1 and FIG. 11 is a snapshot of carrying out the procedure of FIG. 10.

As shown in FIGS. 10 and 11, the script searching unit 250, if a bookmark menu is selected by the user S1010, searches a bookmark database 280 for a bookmark list corresponding to the user and provides the user terminal 110 with the searched bookmark list S1020.

The script searching unit 250, if an inquiry for a particular script among scripts in the bookmark list is selected by the user S1030, provides the user terminal 110 with a particular file S1040. In one embodiment, the bookmark managing unit 260 records tree information and a script identifier in a Config file of XML type; and provides the corresponding Config file to the user terminal 110.

The database updating unit 240, if a script is edited as edition of a particular script among scripts in the bookmark list is selected by the user S1050, updates the active script database 220a, S1060.

The database updating unit 240, if deletion of a particular script among scripts in the bookmark list is selected by the user (for example, removal of a script), updates the active script database 220a.

In one embodiment, the database updating unit 240, if a script of a particular version is deleted by the user, deletes the script selected by the user from a script list of the corresponding user and deletes a script database corresponding to a particular version from a plurality of script databases 220.

The database updating unit 240, if modification of a particular script is selected by the user (for example, script modification), updates the meta database 230 and a plurality of script databases 220. In one embodiment, the database updating unit 240 updates a plurality of script databases 220 with a new version of the corresponding script.

The script searching unit 250, if an inquiry for a previous version of a particular script is selected by the user S1070, searches a particular database among a plurality of script databases 220 for a script and provides the user terminal 110 with the searched script S1080. Here, the particular database is a database storing the previous version of the particular script.

Figure 12:
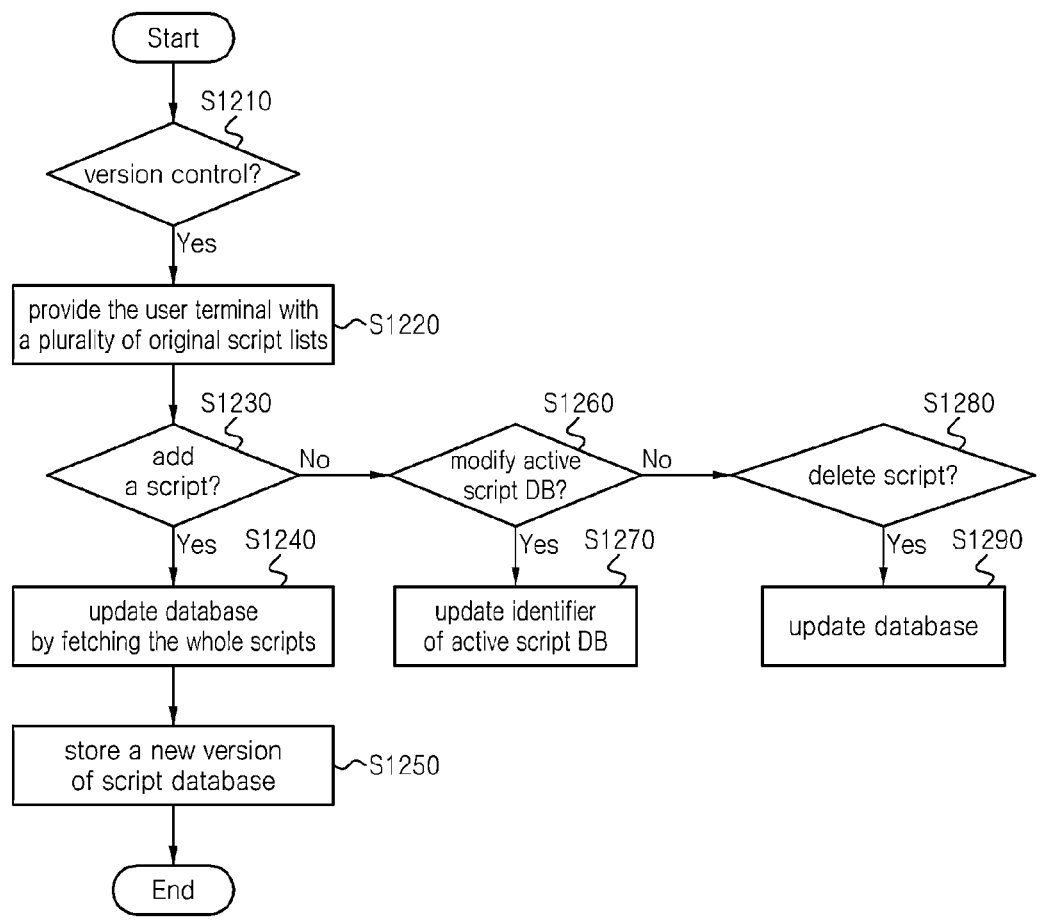
FIG. 12 is a flow diagram illustrating a procedure of version control and importing the whole script carried out in a script management server of FIG. 1.

FIG. 12 is a flow diagram illustrating a procedure of version control and importing the whole script carried out in a script management server of FIG. 1; and FIGS. 13 and 14 are snapshots of carrying out the procedure of FIG. 12.

As shown in FIGS. 12 to 14, the script searching unit 250, if a version control menu 1300 is selected by the user S1210, searches the meta database 230 for a plurality of original script lists and provides the user terminal 110 with the plurality of original script list S1220.

The database updating unit 240, if a script of a particular version is added as a script addition menu 1320 is selected by the user S1230, restores the database by fetching a database backup file for the script S1240 and stores information about a script of a new version in the meta database 230, S1250.

The database updating unit 240, if modification of the active script database 220a is selected by the user S1260, updates an identifier of the active script database 220a, S1270.

The database updating unit 240, if a script deletion menu 1310 is selected by the user and a script of a particular version is deleted S1280, updates the meta database 230 and a plurality of script databases 220, S1290.

In one embodiment, the database updating unit 240, if a script of a particular version is deleted by the user, deletes a script database corresponding to the particular version from a plurality of script databases 220 and updates a script list of the corresponding user in the meta database 230.

As described herein, embodiments disclosed provide at least the following advantages.

A method for managing scripts according to one embodiment of the present invention, a script management server carrying out the method, and a storage medium storing the method can manage original script codes and user-specific script codes according to their script version.

A method for managing scripts according to one embodiment of the present invention, a script management server carrying out the method, and a storage medium storing the method, if a script code in an active script database is updated through a user terminal, can update a database storing the corresponding script code.

A method for managing scripts according to one embodiment of the present invention, a script management server carrying out the method, and a storage medium storing the method, if a script code in an active script database is updated through a user terminal, can track a script list and script codes of the corresponding user according to script code version by determining the script code version of the updated script code.

A method for managing scripts according to one embodiment of the present invention, a script management server carrying out the method, and a storage medium storing the method can provide a bookmark function for the user by storing short cuts to particular script codes in a script list of the corresponding user as a favorites list.

A method for managing scripts according to one embodiment of the present invention, a script management server carrying out the method, and a storage medium storing the method can provide a backup function for the user by transmitting a script list of the corresponding user and part of script codes in the form of text file read by another computer program.

Although this document provides descriptions of preferred embodiments of the present invention, it would be understood by those skilled in the art that the present invention can be modified or changed in various ways without departing from the technical principles and scope defined by the appended claims.

What is claimed is:

1. A method for managing scripts carried out in a script management server which is connected to a user terminal and manages script codes, the method comprising:

preparing, by the script management server, a plurality of databases including a meta database and a plurality of script databases, wherein the script management server comprises at least one computing device;

designating, by the script management server, an active script database by providing a plurality of original script lists to the user terminal; and storing, by the script management server, identifiers of the user terminal and the designated active script database in the meta database, wherein the plurality of script databases are classified according to script version and each of the plurality of script databases manages the original script code and user-specific script code, and wherein the meta database manages the plurality of original script lists related to the plurality of script databases and a list of user-specific scripts, if a script code in the active script database is updated through the user terminal, updating, by the script management server, a script list and script codes of the corresponding user stored in the meta database and the designated active script database, respectively, wherein the updating a script list and script codes of the corresponding user further comprises, if the script code is updated through the user terminal, updating the script in the plurality of script databases into a script of new version for the corresponding script.

2. The method of claim 1, wherein the updating a script list and script codes of the corresponding user further comprises determining a script code version of the updated script code.

3. The method of claim 2, wherein the updating a script list and script codes of the corresponding user further comprises enabling each of the meta database and the designated active script database to track the script list and script codes of the corresponding user according to the determined script code version.

4. The method of claim 1, wherein each of the plurality of lists of original scripts and the list of user-specific scripts are generated to form a tree structure according to a function of the corresponding script code.

5. The method of claim 1, further comprising, if another active script database is designated by the user terminal, updating, by the script management server, the stored identifier of the active script database.

6. The method of claim 5, further comprising removing a script list and script codes of the corresponding user through the user terminal.

7. The method of claim 1, further comprising, if addition of a particular script is requested by the user terminal, adding, by the script management server, the particular script into the active script database.

8. The method of claim 1, further comprising allowing the user terminal to store shortcuts to particular script codes in the script list of the corresponding user as a favorites list.

9. The method of claim 8, wherein the allowing short cuts as a favorites list further comprises recording the path and identifier of the corresponding script in a bookmark file and providing the bookmark file to the user terminal.

10. The method of claim 1, further comprising transmitting, by the script management server, a script list and part of script codes of the corresponding user to the user terminal read in the form of text file by another computer program.

11. The method of claim 1, further comprising transmitting a script list and part of script codes of the corresponding user to the user terminal as a database backup file read by the script management server.

12. A script management server being connected to a user terminal and managing script codes, the script management server including a plurality of computing devices capable of distributed processing, the plurality of devices comprising:

an active script database designating unit designating an active script database by providing the user terminal with a plurality of original script lists;

a plurality of script databases being classified according to script version, each of the plurality of script databases storing original script codes and user-specific script codes;

a meta database storing the plurality of original script lists associated with the plurality of script databases and user-specific script list; and a database updating unit storing identifiers of the user terminal and the designated active script database in the meta database and, if a script code in the active script database is updated through the user terminal, updating the script list and script codes of the corresponding user stored respectively in the meta database and the designated active script database, wherein the database updating unit, if the script code is updated through the user terminal, updates a new version of script for the corresponding script in the plurality of script databases.

13. The script management server of claim 12, wherein each of the plurality of original script lists and the user-specific script list is generated in the form of a tree structure according to the function of the corresponding script code.

14. The script management server of claim 12, wherein the database updating unit determines script code version of the updated script code.

15. The script management server of claim 14, wherein the database updating unit enables each of the meta database and the designated active script database to track the script list and script codes of the corresponding user according to the script code version determined.

16. The script management server of claim 12, wherein the database updating unit, if another active script database is designated by the user terminal, updates an identifier of the stored active script database.

17. The script management server of claim 12, wherein the database updating unit removes a script list and script codes of the corresponding user through the user terminal.

18. The script management server of claim 12, wherein the database updating unit, if addition of a particular script is requested by the user terminal, adds the particular script to the active script database.

19. The script management server of claim 12, further comprising a bookmark managing unit with which the user terminal stores shortcuts to particular script codes in a script list of the corresponding user as a favorites list.

20. The script management server of claim 19, wherein the bookmark managing unit records the path and identifier of the corresponding script in a bookmark file and provides the bookmark file to the user terminal.

21. The script management server of claim 12, further comprising a file generating unit which generates a file read in the form of a text file by another computer program in the user terminal from the script list of the corresponding user and part of script codes.

22. The script management server of claim 21, wherein the file generating unit generates a database backup file read by the script management server in the user terminal from the script list of the corresponding user and the script codes.

23. A non-transitory computer readable storage device storing a computer-readable instructions, that when executed, cause a computer system to perform the following steps:

designating an active script database by providing a user terminal with a plurality of original script lists;

classifying a plurality of scripts according to script version, each of the plurality of script databases storing original script codes and user-specific script codes;

storing the plurality of original script lists associated with a plurality of script databases and a user-specific script list; and storing identifiers of the user terminal and the designated active script database in the meta database and, if a script code in the active script database is updated through the user terminal, updating the script list and script codes of the corresponding user stored respectively in the meta database and the designated active script database, wherein the database updating unit, if the script code is updated through the user terminal, updates a new version of script for the corresponding script in the plurality of script databases.

\* \* \* \* \*